United States Patent
Yamamoto et al.

(10) Patent No.: US 8,690,217 B2
(45) Date of Patent: Apr. 8, 2014

(54) UTILITY VEHICLE

(75) Inventors: Teruaki Yamamoto, Kakogawa (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 200 days.

(21) Appl. No.: 13/338,881

(22) Filed: Dec. 28, 2011

(65) Prior Publication Data

US 2013/0168994 A1 Jul. 4, 2013

(51) Int. Cl.
*B62D 33/02* (2006.01)

(52) U.S. Cl.
USPC .................. 296/24.43; 296/183.1; 296/65.09

(58) Field of Classification Search
USPC .......... 296/26.01, 26.08, 26.11, 183.1, 186.4, 296/24.43, 65.09; 280/756, 748

See application file for complete search history.

(56) References Cited

U.S. PATENT DOCUMENTS

| 6,905,159 B1 | 6/2005 | Saito et al. |
| 6,994,388 B2 | 2/2006 | Saito et al. |
| 7,249,798 B2 | 7/2007 | Saito et al. |
| 8,328,262 B2 * | 12/2012 | Kawabata et al. ......... 296/24.43 |
| 2009/0256388 A1 * | 10/2009 | Tanaka et al. ............. 296/186.4 |

* cited by examiner

*Primary Examiner* — Joseph Pape

(74) *Attorney, Agent, or Firm* — Wenderoth, Lind & Ponack, L.L.P.

(57) ABSTRACT

A utility vehicle includes a rollover protective structure surrounding a riding space and a cargo bed provided behind a riding space. A rear seat is changeable between a seating position and a stowed position. The screen is supported pivotably about pivot point portions such that the screen is changeable between a first position in which the screen stands substantially upright at a location in a vicinity of the front end of the cargo bed in the non-expanded state of the cargo bed, and a second position in which the screen is inclined and extends from the pivot point portions toward the front side of the riding space.

8 Claims, 15 Drawing Sheets

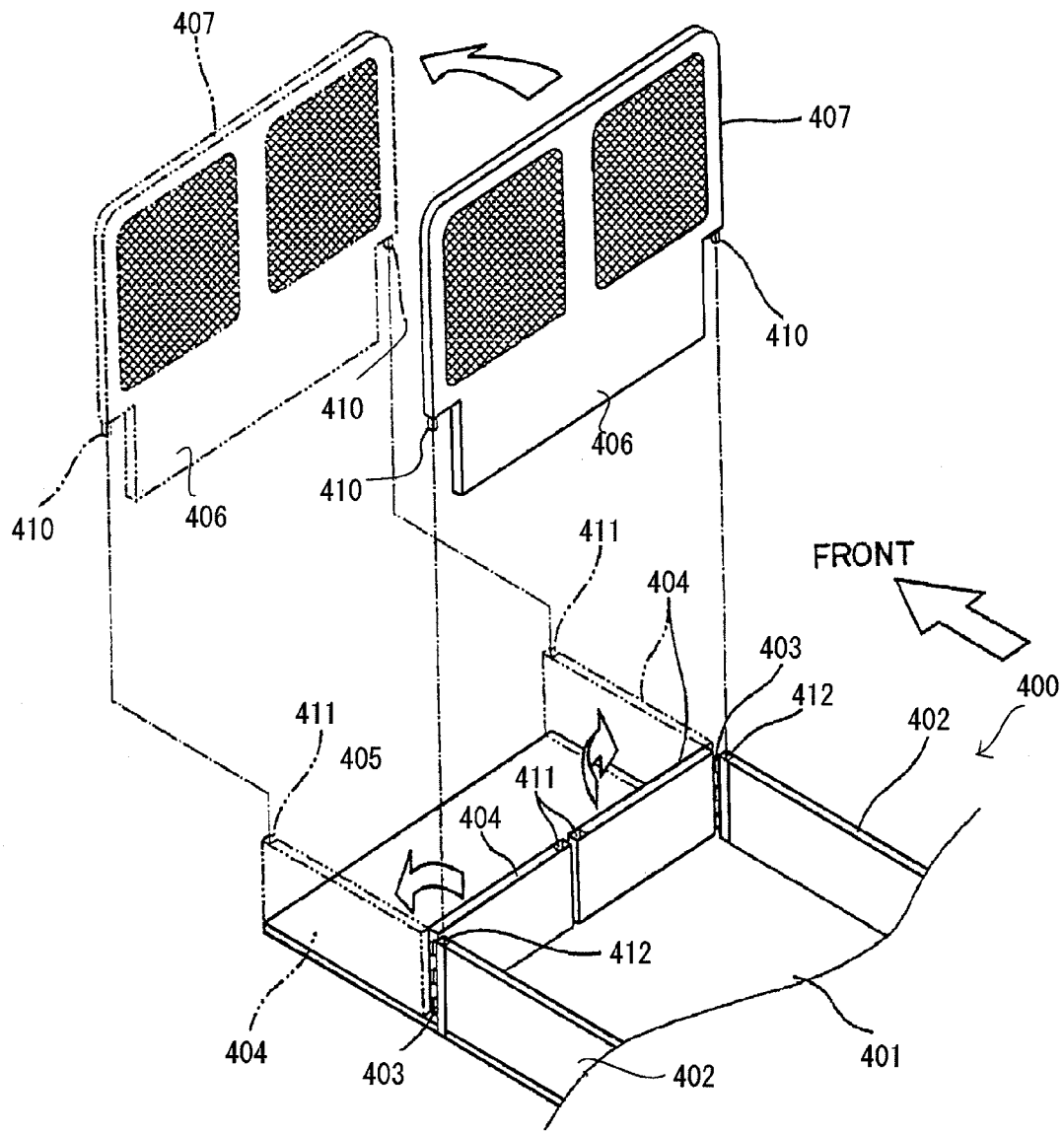

UTILITY VEHICLE

BACKGROUND OF THE INVENTION

1. Field of the Invention

The present invention relates to a utility vehicle in which a cargo bed can be expanded forward so as to utilize an area or a capacity of a cargo bed space and a riding space to a maximum extent according to need of a user.

2. Description of the Related Art

The present applicant filed applications of the inventions relating to a utility vehicle having a cargo bed in which an area or a capacity can be expanded, and those applications have already been registered. Examples include U.S. Pat. Nos. 6,905,159, 6,994,388, and 7,249,798.

A structure of utility vehicles shown in the above documents includes a front seat, a rear seat arranged behind the front seat, and a cargo bed arranged behind the rear seat. By changing the rear seat from a use state to a stowed state, a front part of the cargo bed can be expanded into the riding space which is occupied by the rear seat in the use state.

In such a utility vehicle, a screen is generally provided in a front end of the cargo bed so that a cargo loaded on the cargo bed is not moved to the front side of the cargo bed. There is a need for changing a position of the screen between the time when the cargo bed is expanded forward and the time when the cargo bed is not expanded.

FIG. 21 shows one example of the expandable cargo bed shown in the conventional art document. A cargo bed 400 is provided with a fixed bottom plate 401, left and right fixed side walls 402, a pair of left and right expansion side walls 404 supported pivotably about hinge shafts 403 provided in front ends of the fixed side walls 402, an expansion bottom plate 405 provided in a front end of the fixed bottom plate 401, and a front wall 406. A screen 407 is formed integrally with the front wall 406.

Positioning and fixing pins 410 protruding downward are provided in both left and right ends of the screen 407. Pin insertion holes 411, 412 into which the pins 410 of the screen 407 are insertable are respectively formed on upper surfaces of tip ends of the expansion side walls 404 and upper surfaces of the front ends of the fixed side walls 402.

As shown by solid lines in FIG. 21, when the expansion side walls 404 are closed, the screen 407 is positioned in the front ends of both the fixed side walls 402, and the pins 410 of the screen 407 are inserted into the pin insertion holes 412 of the fixed side walls 402 from the upper side. Meanwhile, as shown by imaginary lines, when the expansion side walls 404 are opened forward, the screen 407 is positioned in front ends of both the expansion side walls 404, and the pins 410 of the screen 407 are inserted into the pin insertion holes 411 of the expansion side walls 404 from the upper side.

In the above configuration, in a case where the screen 407 is moved between an expansion position at the time of expansion of the cargo bed 400 and a non-expansion position at the time of non-expansion of the cargo bed 400, firstly, the screen 407 has to be brought up together with the front wall 406 in order to draw the left and right pins 410 from the pin insertion holes 411 or 412. After that, there is a need for integrally moving the screen 407 and the front wall 406 rearward or forward and after moving, inserting the pins 410 into the pin insertion holes 412 or 411 from the upper side.

However, since the screen 407 integrally having the front wall 406 ranges over the substantially entire lateral width of the cargo bed 400, the screen is not easily moved by one person. Therefore, currently, two workers are required to hold and pull up the left and right ends of the screen 407 and the front wall 406 so as to draw the pins 410 and after moving, insert the pins into the pin insertion holes 411 or 412 again. Thus, movement of the screen 407 requires time and efforts.

SUMMARY OF THE INVENTION

An object of the present invention is to simplify a moving task of a screen accompanying expansion and contraction tasks of a cargo bed, so that even one worker can easily and promptly move the screen. Alternatively, a loading height of a cargo can be restricted.

In order to achieve the above object, the present invention provides a utility vehicle including a ROPS surrounding a riding space, a front seat and a rear seat arranged in the riding space, a cargo bed provided behind the riding space, the cargo bed being changeable between an expanded state in which the cargo bed is expanded forward into the riding space and a non-expanded state in which the cargo bed is not expanded in the riding space, and a screen arranged in a front end of the cargo bed, wherein the rear seat is capable of being accommodated at a rear position of the front seat at the time of the expanded state of the cargo bed, and the screen is supported pivotably about pivot point portions lower than an upper end of the ROPS, a pivot position of the screen being changeable between a first position of substantially upright standing at a position in the vicinity of the front end of the cargo bed in the non-expanded state, and a second position of inclining so as to extend from the pivot point portions toward the front lower side.

According to the above configuration, there is no need for bringing up the screen in a task of expanding or contracting the cargo bed. Only by swinging the screen about pivot points, the position of the screen can be simply changed in correspondence with a change between an expansion position and a non-expansion position of the cargo bed. That is, one worker can simply change the position of the screen.

At the time of the expanded state of the cargo bed, the screen at the second position inclines so as to extend from the pivot points toward the front lower side. Thus, the loading height of the cargo in a front part of the cargo bed can be restricted. Thereby, shaking of the cargo due to a vibration during traveling can also be reduced.

In the above utility vehicle, the following configurations can be preferably adopted.

(a) A lower end of the screen and a rear end of a seat bottom are pivotably coupled to each other in such a manner that the screen is moved from the first position to the second position in accordance with movement of the seat bottom of the rear seat to a front position.

According to the above configuration, by performing a stowing task of the rear seat, the screen can be automatically moved. That is, a change task between a use state and a stowed state of the rear seat and the moving task of the screen between the first position and the second position can be performed by one task, so that working efficiency is improved.

(b) A large number of openings from which the rear side is visually recognizable through the screen are formed in the screen, and the openings are formed into a shape elongated in the up and down direction.

According to the above configuration, even in a case where the screen is moved to the second position of an inclination posture, a driver and a passenger in the front seat can confirm the rear side through the openings of the screen.

(c) Side wall parts of the screen have guide grooves extending along the screen longitudinal direction, the guide grooves are engaged with the pivot point portions in such a manner that the screen is pivotable about the pivot point portions and movable in the guide groove longitudinal direction, and further, locking recess portions to be fitted to the pivot point portions so as to hinder movement of the screen in the longitudinal direction at any of the first position and the second position of the screen are formed in ends of the guide grooves in the longitudinal direction.

According to the above configuration, since the movement of the screen is guided by the guide grooves, the moving task of the screen can be smoothly performed. Moreover, the screen can be locked by utilizing the same locking recess portions at any of the first and second positions.

(d) A seat fixing anchor is provided in the cargo bed, and a hook to be engaged with the anchor so as to lock a backrest in a standing state is provided in the backrest.

According to the above configuration, the seat can be fixed to a vehicle body via the backrest by the anchor and the hook to be engaged with the anchor. That is, by utilizing the seat fixing anchor, the backrest can be locked in the standing state together with the seat.

(e) In a structure provided with the seat fixing anchor, the anchor is formed into an inverted U shape or an L shape with which a rope for fixing a loading cargo is engageable.

According to the above configuration, the anchor can also be utilized for fixing the cargo, so that a utilization range is widened.

BRIEF DESCRIPTION OF THE DRAWINGS

FIG. 21 is a perspective view of a utility vehicle of a conventional example.

DETAILED DESCRIPTION OF THE INVENTION

Based on FIGS. 1 to 20, an embodiment of the present invention will be described.

[Entire Structure of Vehicle]

Figure 1:
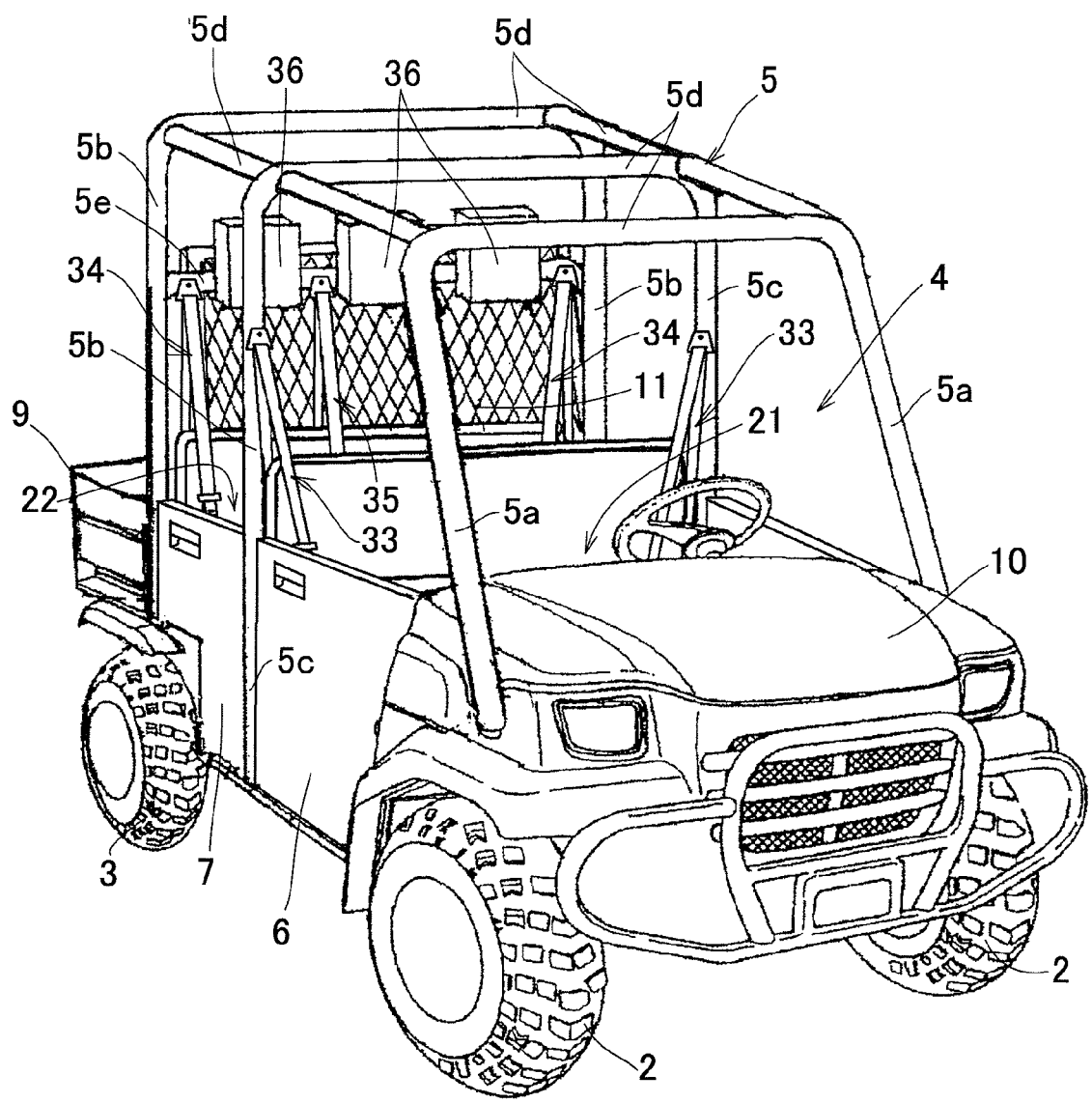
FIG. 1 is a perspective view of a utility vehicle according to the present invention.

FIG. 1 is a perspective view of an entire utility vehicle according to the present invention. The utility vehicle is provided with a pair of left and right front wheels 2 in a front part of a vehicle body, a pair of left and right rear wheels 3 in a rear part of the vehicle body, and a riding space (cabin) 4 between the front wheels 2 and the rear wheels 3. The riding space 4 is surrounded by a ROPS 5, a pair of front doors 6 and a pair of rear doors 7. Further, an expandable cargo bed 9 is provided behind the riding space 4, a bonnet 10 is provided in front of the riding space 4, and a screen 11 is provided in a front end of the cargo bed 9.

Figure 2:
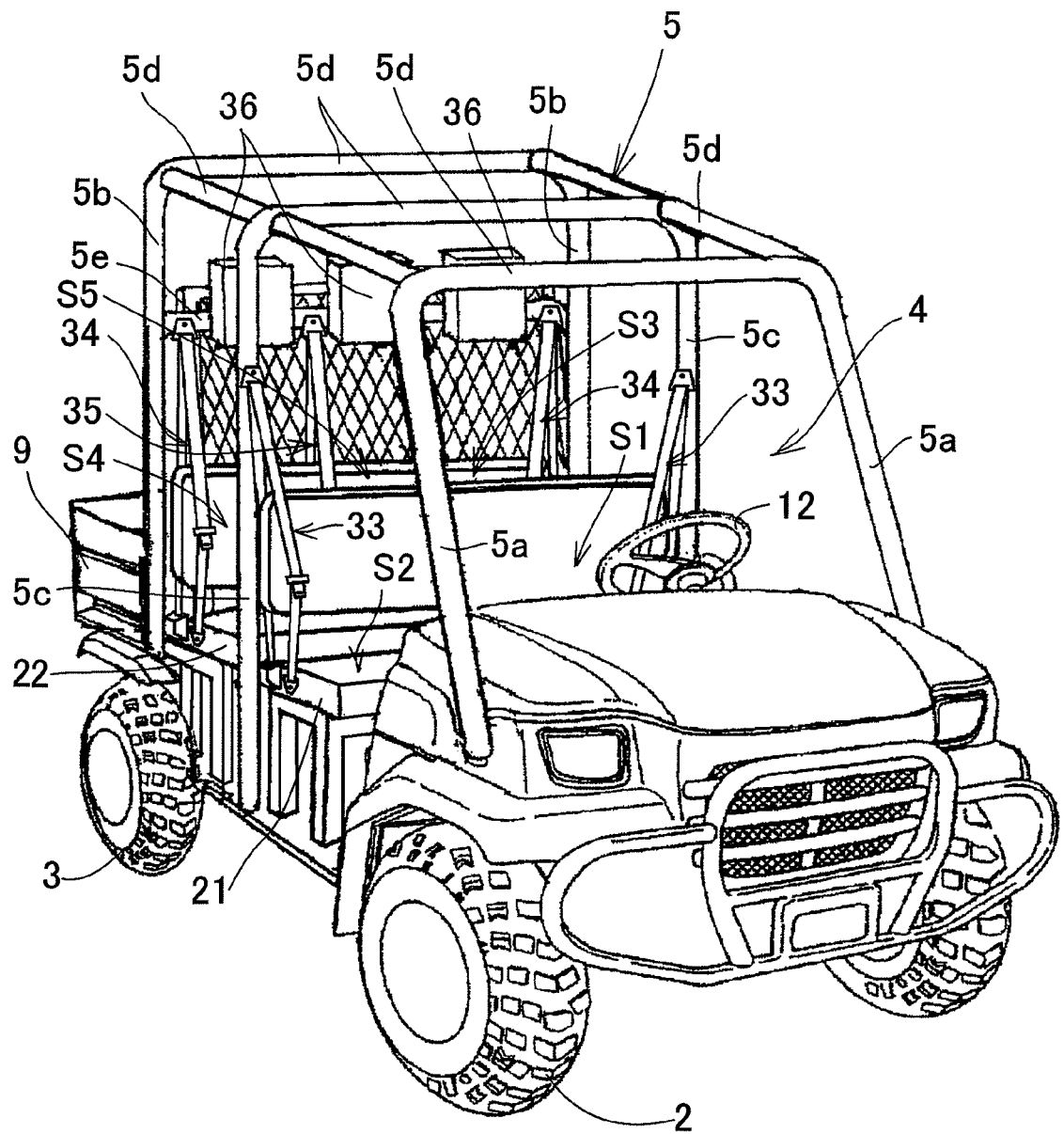
FIG. 2 is a perspective view of the same utility vehicle as FIG. 1 shown as doors are removed.

FIG. 2 is a perspective view of the utility vehicle shown as the front and rear doors 6, 7 are removed. A bench type front seat 21 is installed in a front half part of the riding space 4, and a bench type stowable rear seat 22 is installed in a rear half part of the riding space 4. In the embodiment, the bench type front seat 21 is two-seater, and three point seatbelt apparatuses 33 are respectively provided in left and right seating areas S1, S2 of the front seat 21. The left seating area S1 of the front seat 21 is a driver seat, and an operation portion such as a handle 12 is provided in front of the left seating area S1. The bench type rear seat 22 is three-seater. Three point seatbelt apparatuses 34 are respectively provided in left and right seating areas S3, S4 of the rear seat 22, and further, a three point seatbelt apparatus 35 is also provided in a central seating area S5.

[Configuration of ROPS 5]

The ROPS 5 is an abbreviation of a rollover protective structure provided with a pair of left and right front vertical members 5a, a pair of left and right rear vertical members 5b, a pair of left and right intermediate vertical members 5c arranged between the front vertical members 5a and the rear vertical members 5b, and a plurality of upper end beam members 5d for coupling upper ends of the vertical members 5a, 5b, 5c. Further, a cross member 5e extending in the vehicle width direction is integrally formed in the pair of left and right rear vertical members 5b. The cross member 5e is arranged at a position lower than the upper end beam members 5d. Specifically, the cross member 5e is arranged at height corresponding to a shoulder or a neck of a rider seated on the rear seat 22 (refer to FIG. 6), and three headrests 36 for the rear seat are provided in the cross member 5e.

[Configuration of Cargo Bed 9]

Figure 3:
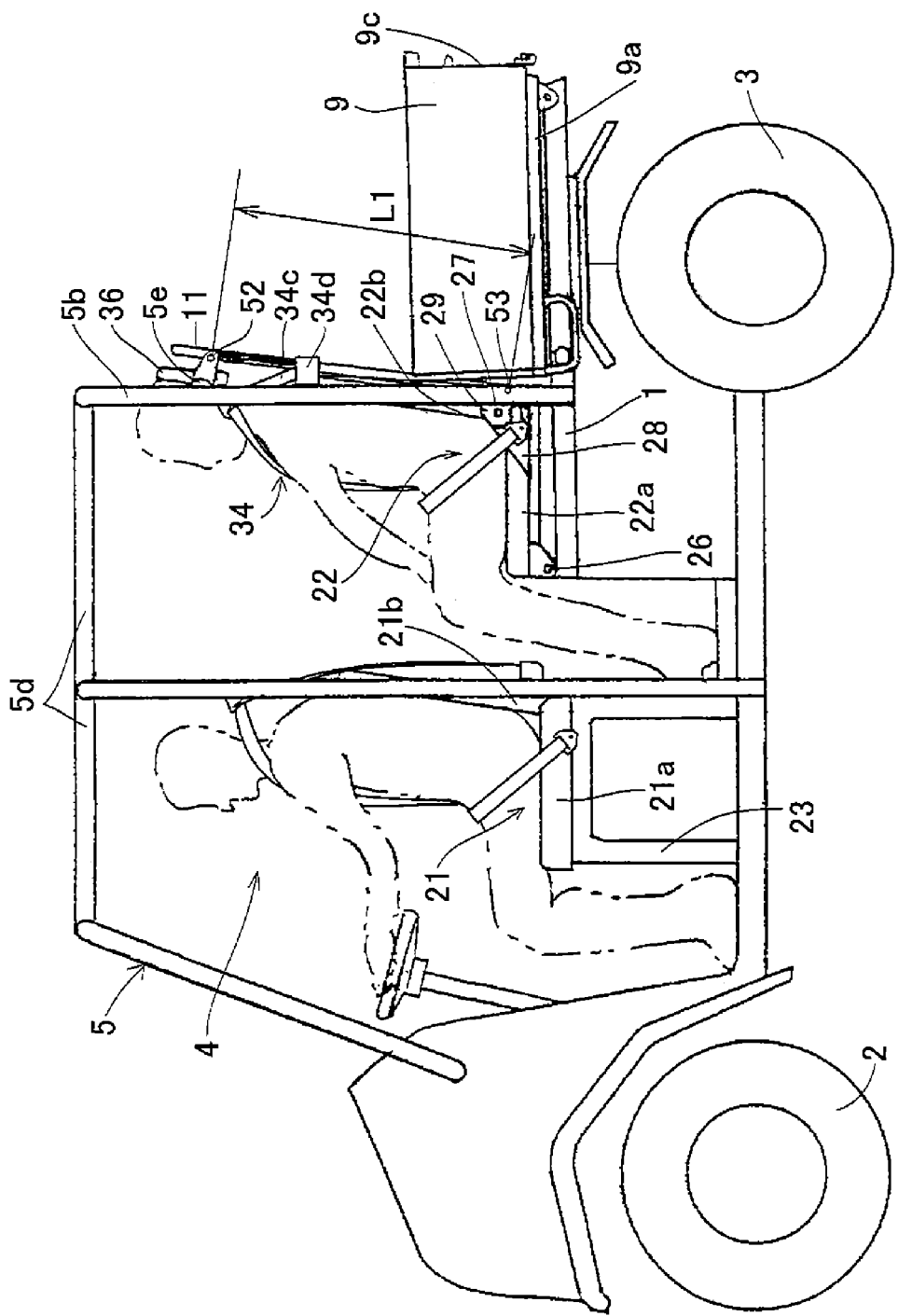
FIG. 3 is a left side view of the utility vehicle of FIG. 1 at the time of non-expansion of a cargo bed.
Figure 4:
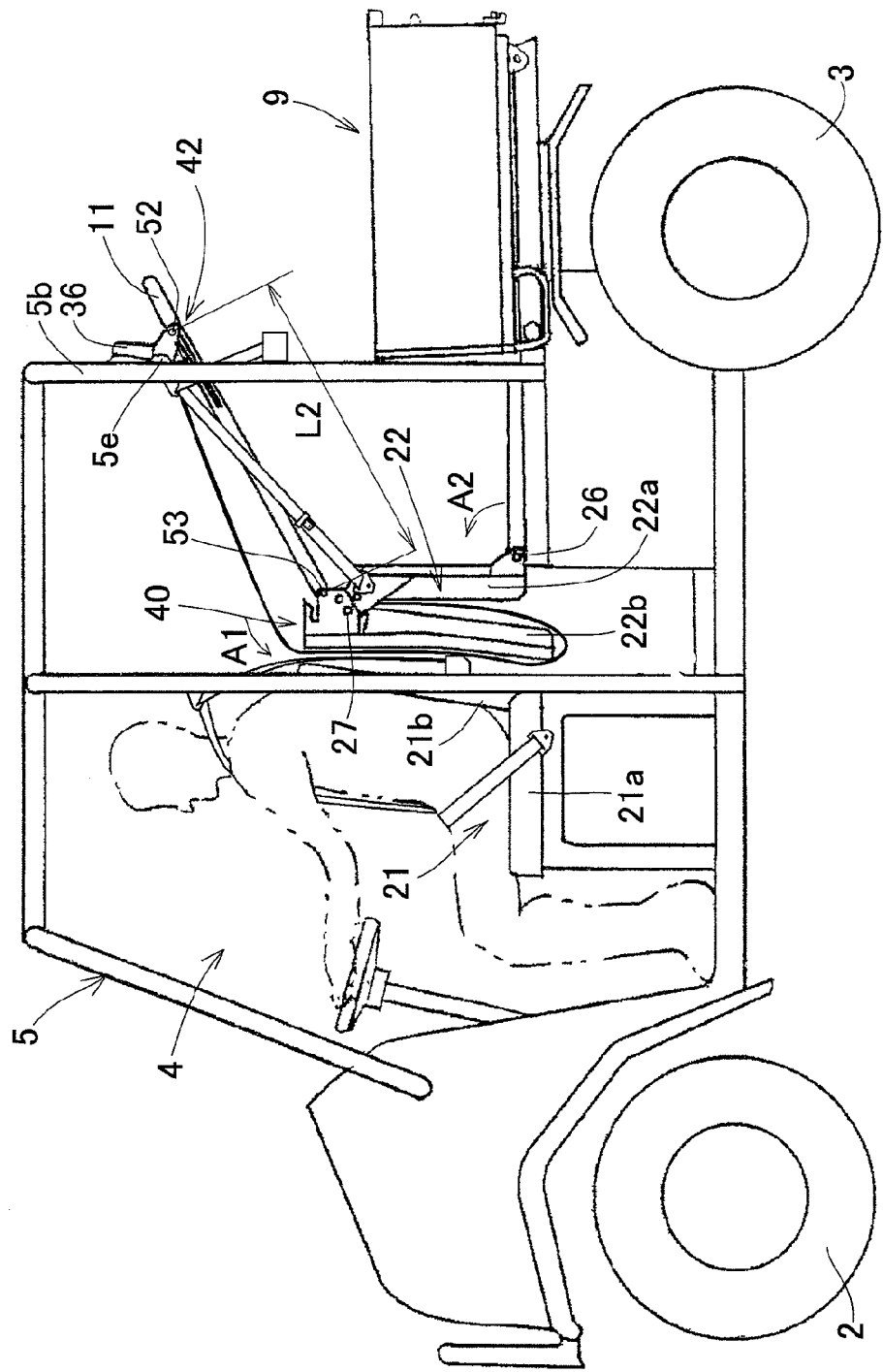
FIG. 4 is a left side view of the utility vehicle of FIG. 1 at the time of expansion of the cargo bed.

FIG. 3 is a left side view of the utility vehicle in a non-expanded state of the cargo bed 9, and FIG. 4 is a side view of the utility vehicle in an expanded state of the cargo bed 9. In FIG. 3, the cargo bed 9 is provided with a bottom wall 9a, left and right side walls 9b and a rear wall 9c. At the time of the non-expanded state of the cargo bed 9, the stowable rear seat 22 is in a use state (a state that the rider can be seated).

In FIG. 4, at the time of the expanded state of the cargo bed 9, the rear seat 22 is folded and stowed immediately behind the front seat 21.

[Configuration of Front Seat 21]

In FIG. 3, the bench type front seat 21 is provided with one rectangular seat bottom 21a elongated in the lateral direction and one rectangular backrest 21b elongated in the lateral direction. The seat bottom 21a and the backrest 21b are fixed to support legs 23.

[Configuration of Rear Seat 22]

In FIG. 3, the bench type stowable rear seat 22 is provided with one rectangular seat bottom 22a elongated in the lateral direction, one rectangular backrest 22b and the three headrests 36. As described above, the rear seat 22 is formed in such a manner that a position thereof is changeable between the seating position in which the rider can be seated while facing forward (FIG. 3) and a stowed position in which the rear seat is stowed on the back of the backrest 21b of the front seat 21 (FIG. 4). A specific folding structure will be described. A front end of the seat bottom 22a of the rear seat 22 is pivotably supported by a vehicle body frame 1 via a front hinge 26, and a lower end of the backrest 22b is pivotably coupled to a rear end of the seat bottom 22a via a rear hinge 27. The rear hinge 27 provides pivotable coupling between a metal seat bottom side bracket 28 secured to the rear end of the seat bottom 22a and a metal backrest side bracket 29 secured to the lower end of the backrest 22b.

As shown in FIG. 4, in a state that the rear seat 22 is stowed, the backrest 22b is pivoted anticlockwise (in the arrow A1 direction) on the rear hinge 27 and abutted with a surface of the seat bottom 22a, and the seat bottom 22a is pivoted anticlockwise (in the arrow A2 direction) on the front hinge 26 and brought into a substantially vertical state at a rear position of the backrest 21b of the front seat 21. That is, since the backrest 22b is folded on the rear hinge 27 so as to be substantially parallel to the seat bottom 22a and further, the backrest 22b in a folded state and the seat bottom 22a are pivoted front-upward on the front hinge 26, the rear seat 22 is changed into the standing stowed state as in FIG. 4.

A pair of lock mechanisms 40 is provided in left and right ends of the rear seat 22 so as to lock the rear seat 22 in the use state.

[Lock Mechanism 40 of Rear Seat 22]

Figure 15:
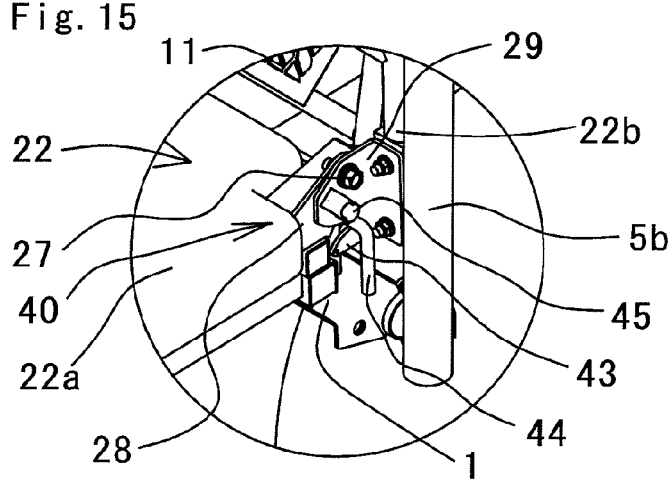
FIG. 15 is a perspective view of a lock mechanism of the rear seat in a use state.

FIG. 15 shows the left lock mechanism 40 of the rear seat 22. The lock mechanism 40 is provided with a hook 43 for locking the backrest 22b in the use state (standing state) onto the vehicle body frame 1, a U shape anchor (hook receiver) 44 provided in the vehicle body frame 1 so as to be engageable with the hook 43, and a lock pin 45 for fixing the seat bottom 22a to the backrest 22b.

The hook 43 is formed in a lower end of the bracket 29 of the backrest 22b integrally with the bracket 29, protrudes forward, and is engaged with an upper end beam part of the anchor 44 from behind. By engaging the hook 43 with the anchor 44, the backrest 22b is maintained in the standing state (use state) with respect to the vehicle body frame 1.

Figure 17:
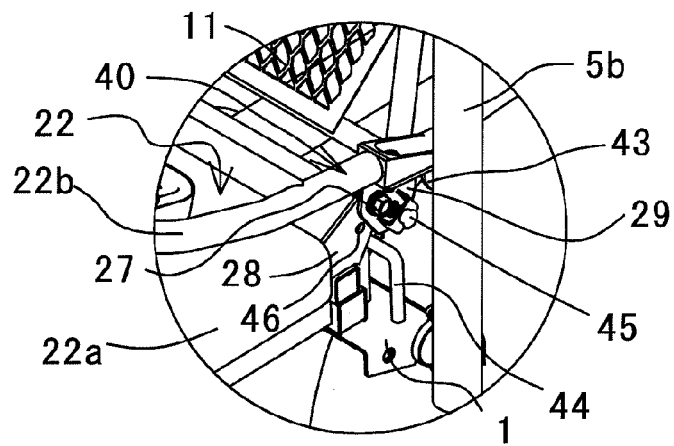
FIG. 17 is a perspective view of the lock mechanism of the rear seat in a stowed state.

The lock pin 45 is supported by the bracket 29 of the backrest 22b. Meanwhile, as shown in FIG. 17, an engagement hole 46 to be engaged with the lock pin 45 at the time of the use state of the seat bottom 22a is formed in the bracket 28 of the seat bottom 22a.

Figure 18:
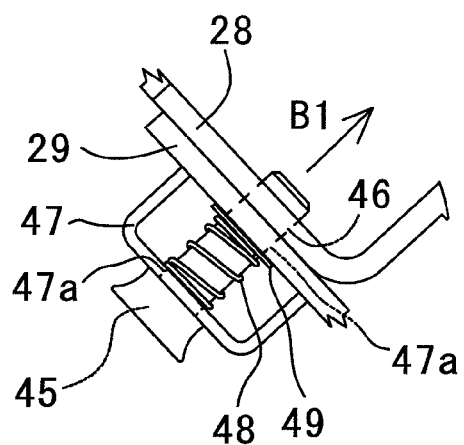
FIG. 18 is an enlarged side view of a lock pin of the lock mechanism of the rear seat.

FIG. 18 is an enlarged sectional view of the lock pin 45. A U shape pin support base 47 is secured to the bracket 29 of the backrest 22b, and the lock pin 45 is inserted into pin holes 47a formed in the pin support base 47 and the bracket 29 movably in the lateral direction. The lock pin 45 is biased in the lock direction B1 (inward in the vehicle width direction) by a coil spring 48 compressed and provided in the pin support base 47 via a spring seat 49. That is, when the backrest 22b is pivoted with respect to the seat bottom 22a as in FIG. 10 and the lock pin 45 is brought to a position corresponding to the engagement hole 46 of the seat bottom side bracket 28 as in FIG. 18, by elastic force of the coil spring 48, the lock pin 45 automatically runs into the engagement hole 46, and the seat bottom 22a in the use state is locked with respect to the backrest 22b in the state of FIG. 10.

[Configuration of Seatbelt Apparatuses 34, 35 of Rear Seat 22]

Figure 5:
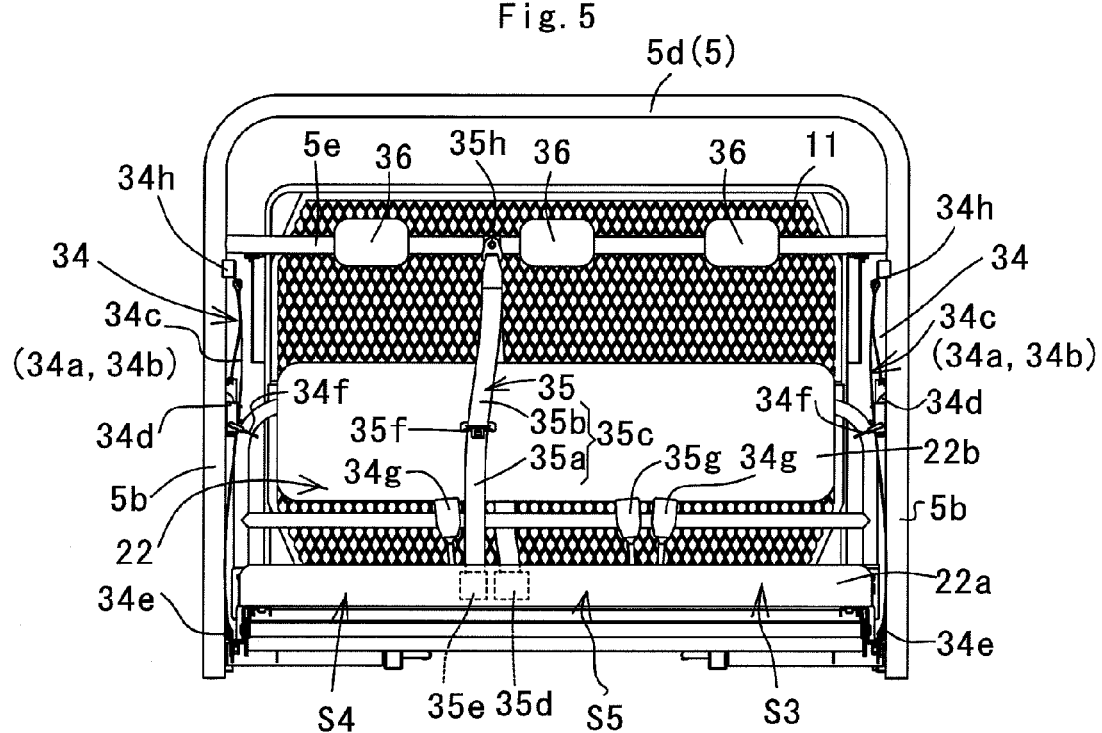
FIG. 5 is a front view of a rear seat at the time of non-seating.
Figure 6:
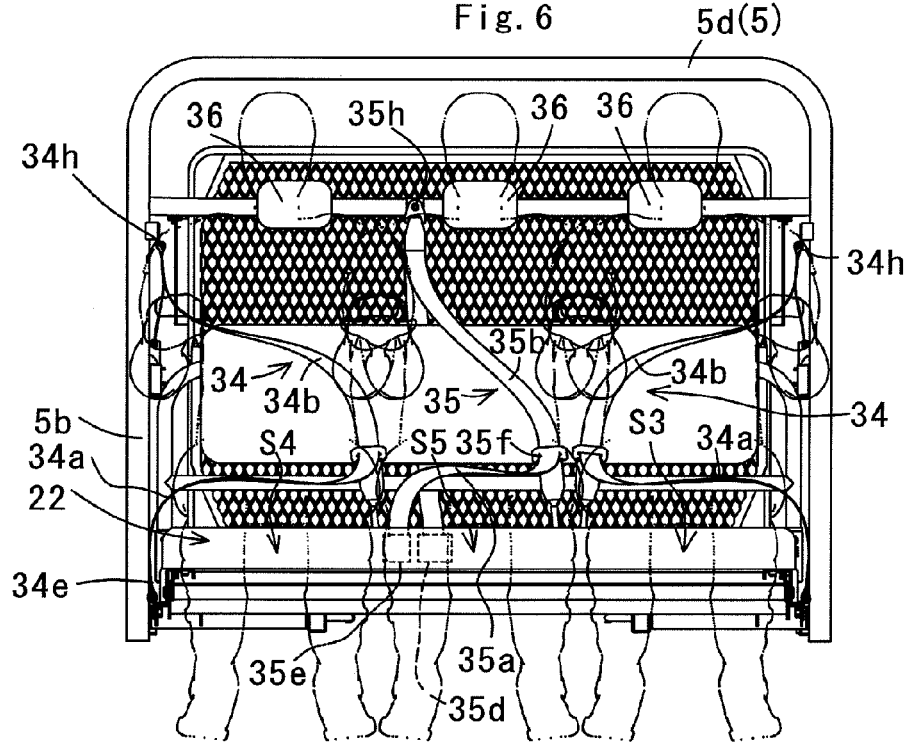
FIG. 6 is a front view of the rear seat at the time of seating.

FIG. 5 is a front view of the rear seat 22 in a non-seating state, and FIG. 6 is a front view of the rear seat 22 in a seating state. In FIG. 5, the three point seatbelt apparatus 35 for the central seating area S5 of the rear seat 22 is provided with a webbing 35c integrally having a lap belt 35a and a shoulder belt 35b, a retractor 35d provided in the rear end of the seat bottom 22a of the rear seat 22, the retractor for supporting one end of the webbing 35c so as to freely wind the one end, a bottom anchor 35e provided in the rear end of the seat bottom 22a of the rear seat 22, the bottom anchor for supporting the other end of the webbing 35c, a tongue plate 35f installed in the middle of the webbing 35c, a buckle 35g provided in the seat bottom 22a and detachably coupled to the tongue plate 35f, and a top anchor 35h for supporting the shoulder belt 35b.

The top anchor 35h of the three point seatbelt apparatus 35 of the central seating area S5 is provided on the cross member 5e formed in a rear end of the ROPS 5. The top anchor 35h slidably supports the webbing 35c extending upward from the retractor 35d on the rear side of the backrest 22b, and folds the webbing 35c downward along the front side of the backrest 22b.

The top anchor 35h, the bottom anchor 35e and the retractor 35d of the central seating area S5 are arranged on the opposite side of the driver seat side (that is, the right side) of the front seat 21 with respect to the central seating area S5. Therefore, in the non-seating state, the entire webbing 35c is positioned on the right side of the central seating area S5.

Each of the three point seatbelt apparatuses 34 of the left and right seating areas S3, S4 of the rear seat 22 has the same structure as the three point seatbelt apparatus 35 of the central seating area S5 except for a structure that a top anchor 34h and a retractor 34d are attached to the rear vertical member 5b of the ROPS 5. That is, a structure and attachment of a webbing 34c integrally having a lap belt 34a and a shoulder belt 34b, the retractor 34d, a bottom anchor 34e, a tongue plate 34f, and a buckle 34g are the same as the three point seatbelt apparatus 35 of the central seating area S5.

[Configuration of Seatbelt Apparatus 33 of Front Seat 21]

In FIG. 1, the two three point seatbelt apparatuses 33 of the front seat 21 have the same structure as the left and right three point seatbelt apparatuses 34 of the rear seat 22.

[Configuration of Screen 11]

Figure 7:
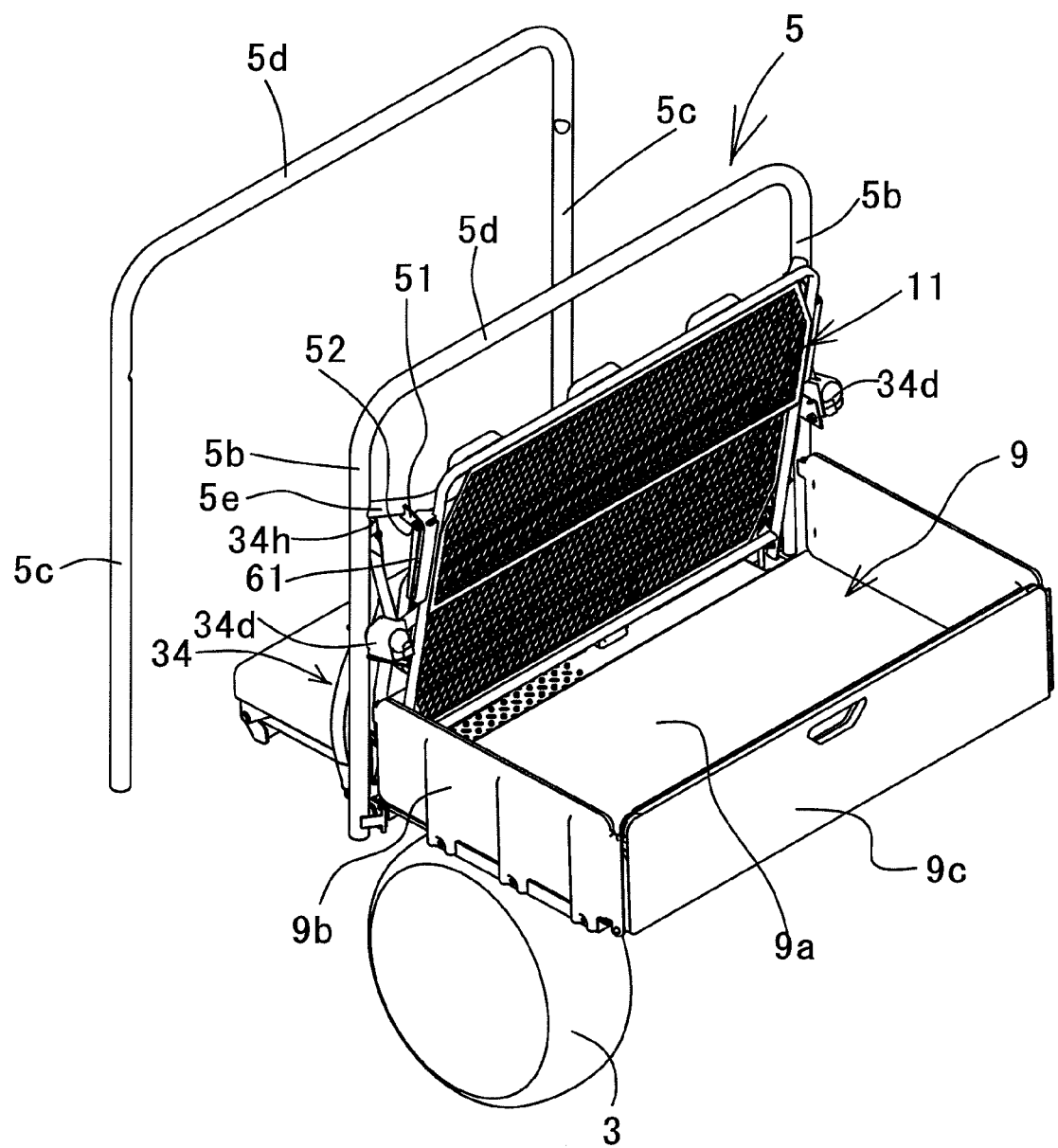
FIG. 7 is a perspective view of the rear seat, a screen and the cargo bed at the time of the non-expansion of the cargo bed when seen from the rear upper side.
Figure 8:
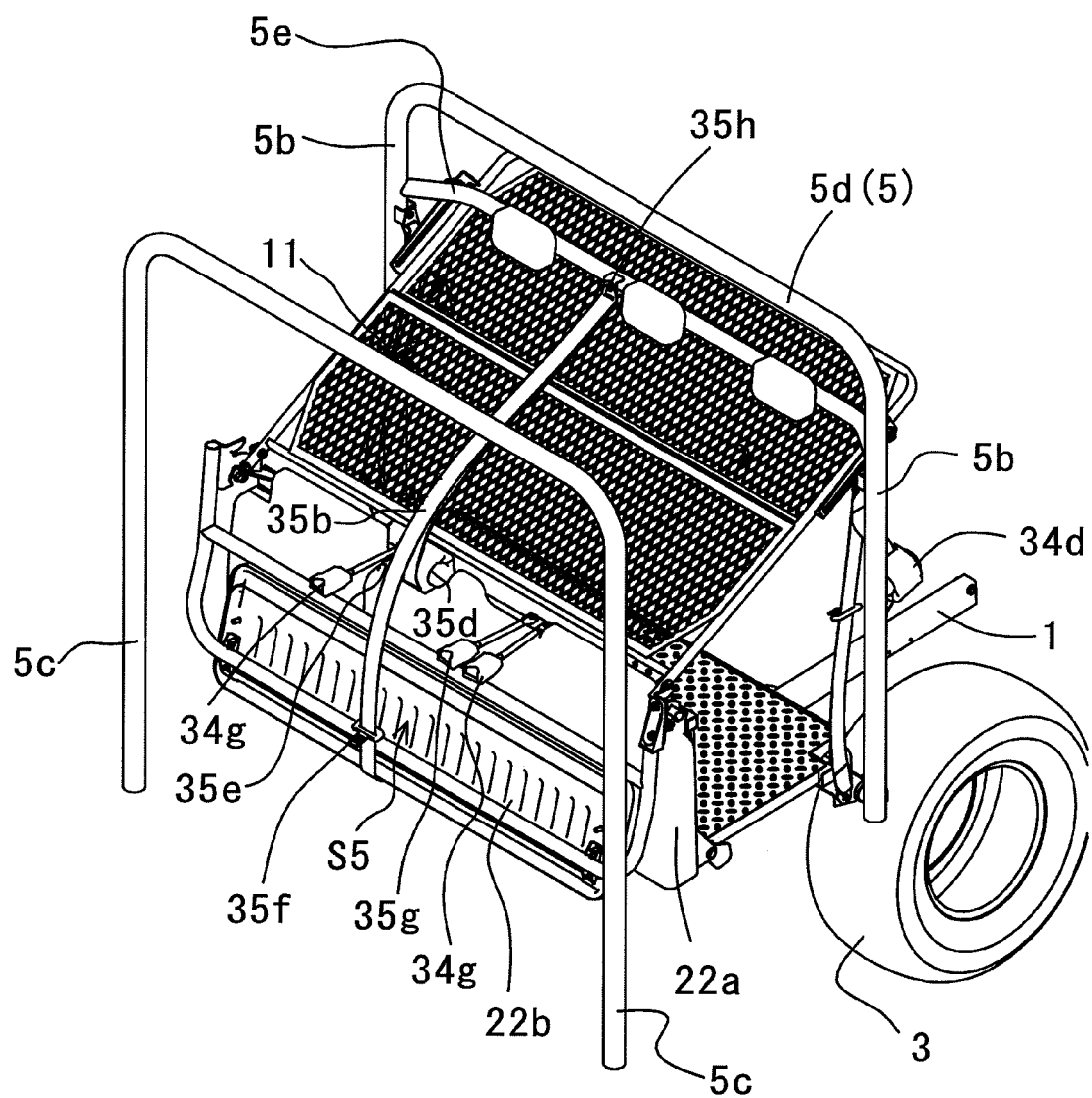
FIG. 8 is a perspective view of the rear seat, the screen and the cargo bed at the time of the expansion of the cargo bed when seen from the front upper side.

FIG. 7 shows a state that the screen 11 is placed at a first position, and FIG. 8 shows a state that the screen 11 is placed at a second position. As shown in FIG. 7, left and right ends of the screen 11 are supported by a pair of left and right support brackets 51 provided on the cross member 5e of the ROPS 5 pivotably via guide pins 52 and linearly movably along the screen longitudinal direction (the longitudinal direction of guide grooves 61 described later). By pivoting the screen 11 on the guide pins 52 and linearly moving the screen along the screen longitudinal direction with respect to the guide pins 52 (described in detail later), a position of the screen 11 is changeable between the first position for partitioning the cargo bed 9 in the non-expanded state and the rear seat 22 in the use state as shown in FIG. 7 and the second position for covering the cargo bed 9 in the expanded state and a front part in an inclination posture as shown in FIG. 8.

Figure 9:
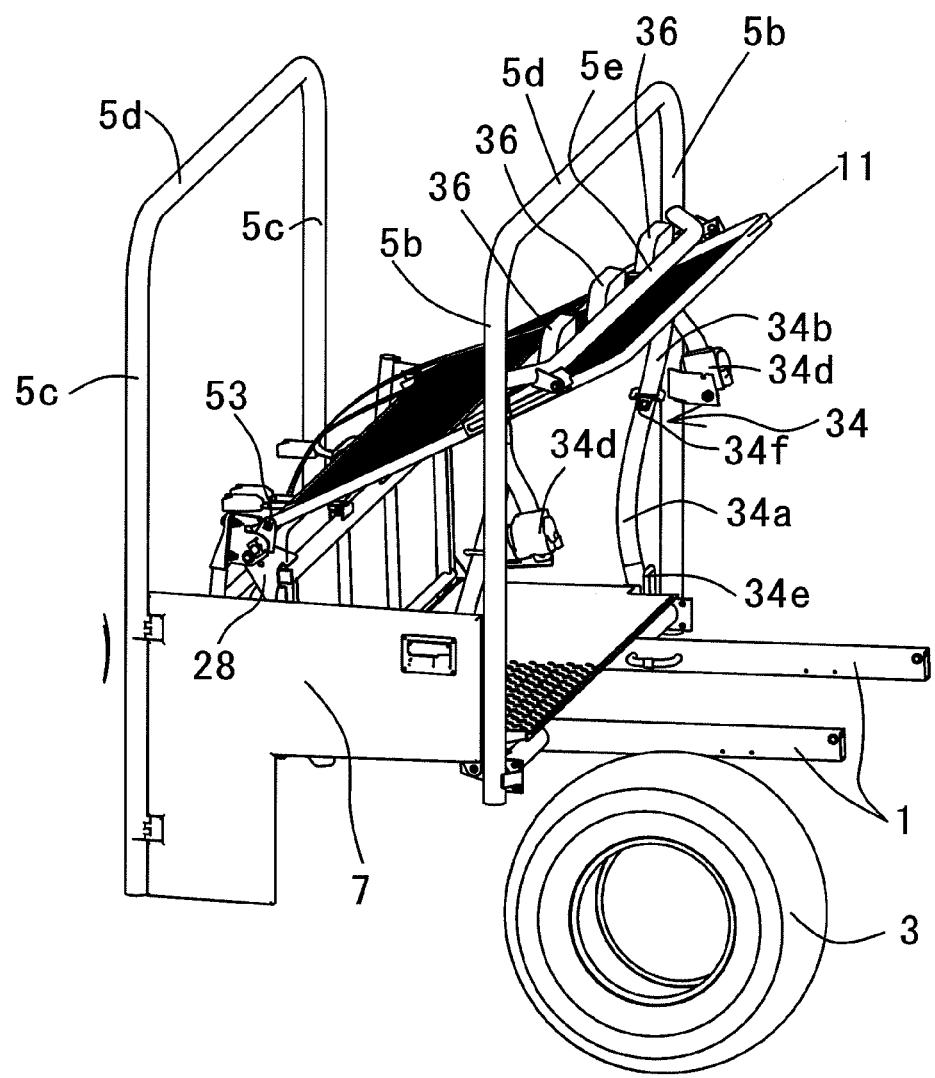
FIG. 9 is a perspective view of the rear seat, the screen and the cargo bed at the time of the expansion of the cargo bed when seen from the rear upper side.
Figure 11:
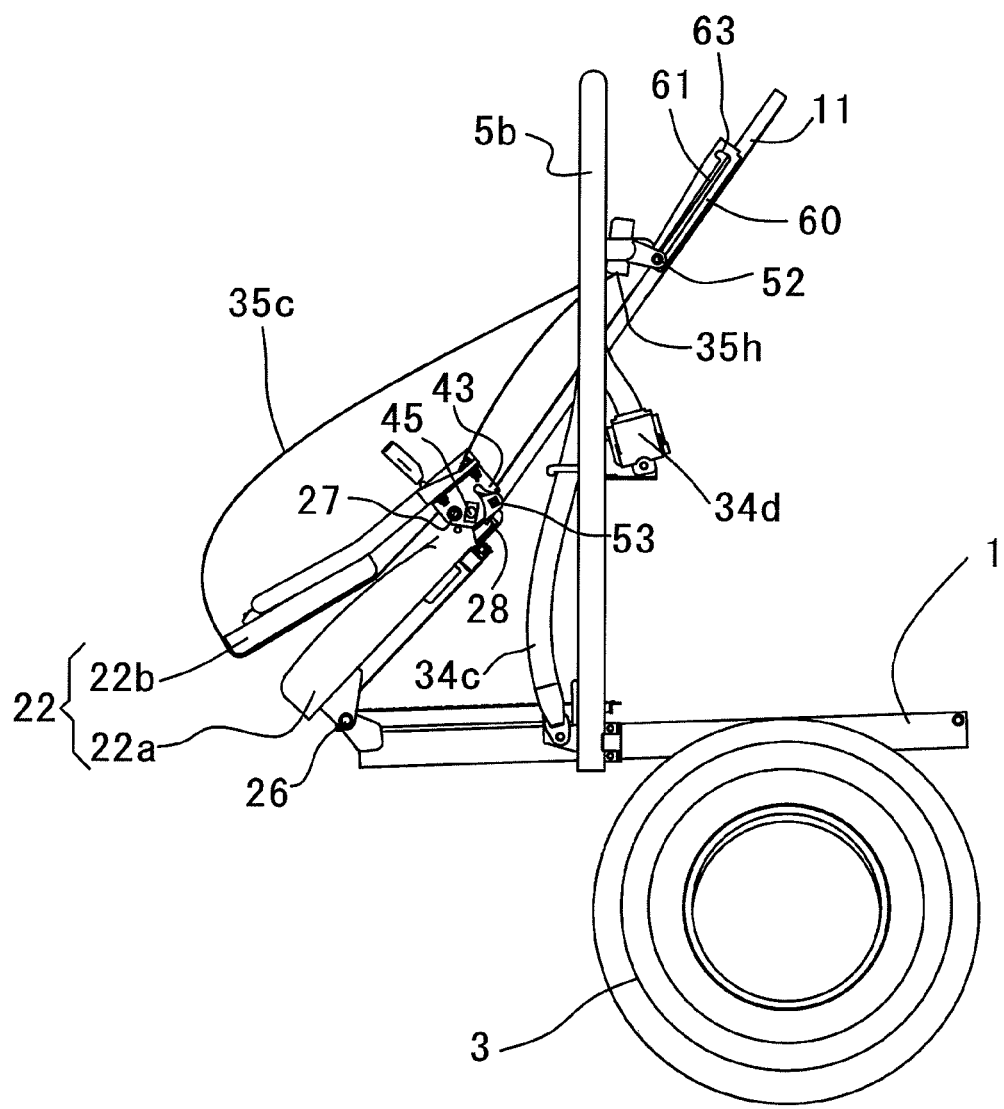
FIG. 11 is a left side view of the rear seat and the screen in the middle of the expansion of the cargo bed.

In FIGS. 9 and 11, a lower end of the screen 11 is coupled to the bracket 28 provided in the rear end of the seat bottom 22a of the rear seat 22 pivotably via hinge pins 53. Thereby, the lower end of the screen 11 is movable together with the rear end of the seat bottom 22a of the rear seat 22.

In a case where the screen 11 is placed at the first position as shown in FIG. 7, the screen 11 is maintained in a substantially upright state at a position in the front and rear direction which is substantially the same as the rear vertical members 5b of the ROPS 5. Meanwhile, in a case where the screen 11 is placed at the second position as shown in FIG. 8, the lower end of the screen 11 is moved front-upward together with the rear end of the seat bottom 22a of the rear seat 22, and the entire screen 11 is inclined so as to extend front-downward from the cross member 5e.

Figure 19:
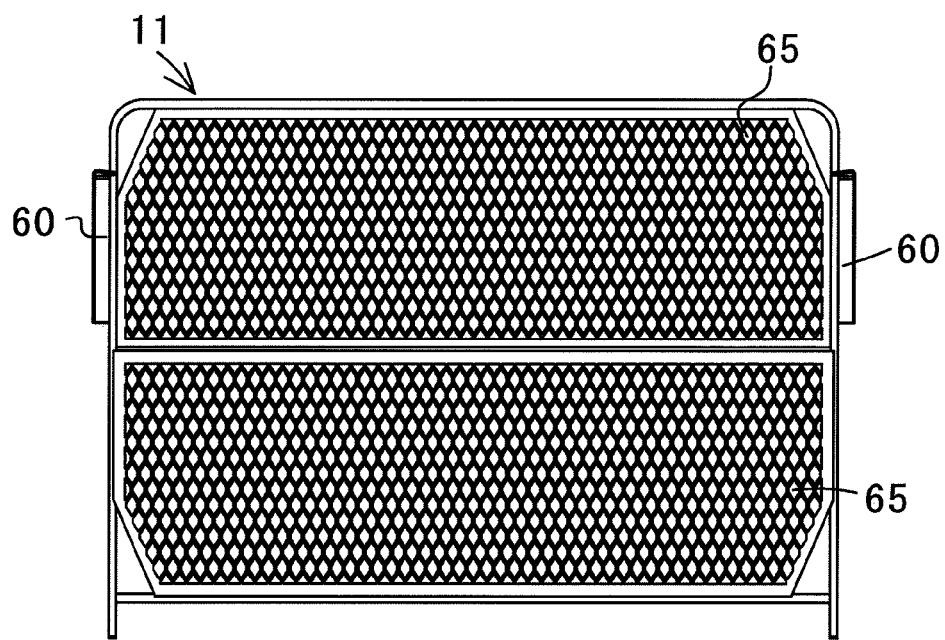
FIG. 19 is a front view of the screen at a first position.
Figure 20:
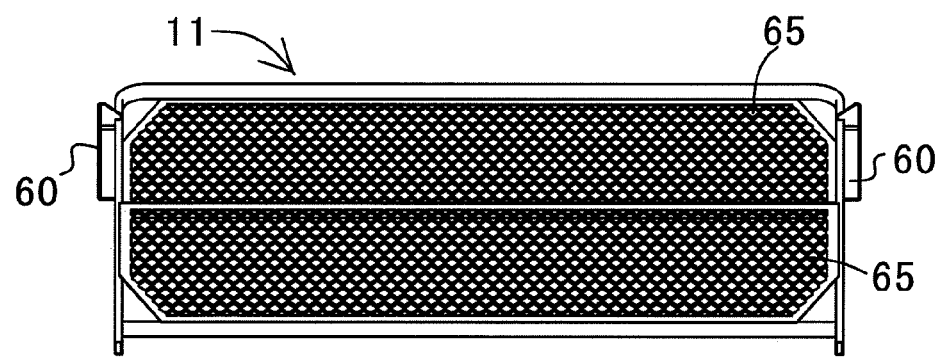
FIG. 20 is a front view of the screen at a second position.

FIG. 19 is a front view of the screen 11 at the first position, and FIG. 20 is a front view of the screen 11 at the second position. In FIG. 19, a large number of diamond shape openings 65 are formed over the substantially entire surface of the screen 11, and the rear side can be visually recognized through the openings 65. The openings 65 are elongated in the up and down direction. Therefore, even when the screen 11 is inclined to the second position as in FIG. 20, the rear side can be visually recognized from the diamond shape openings 65.

[Guide Mechanism 42 of Screen 11]

Figure 12:
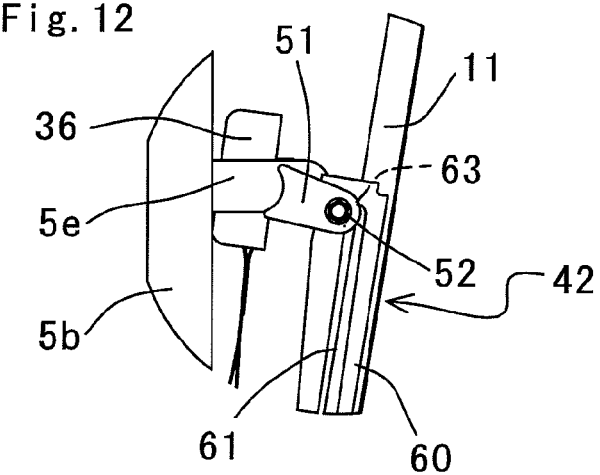
FIG. 12 is a left side view of a guide mechanism of the screen at the time of the non-expansion of the cargo bed.
Figure 13:
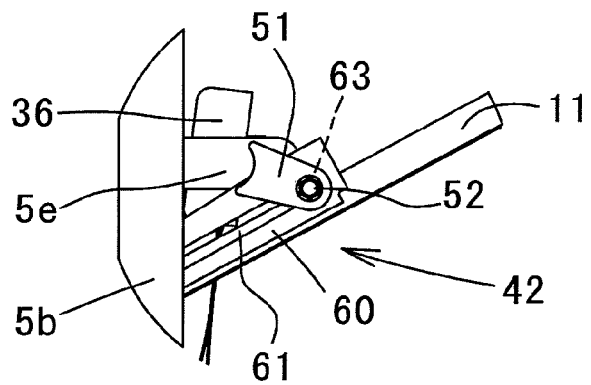
FIG. 13 is a left side view of the guide mechanism of the screen in the middle of the expansion of the cargo bed.
Figure 14:
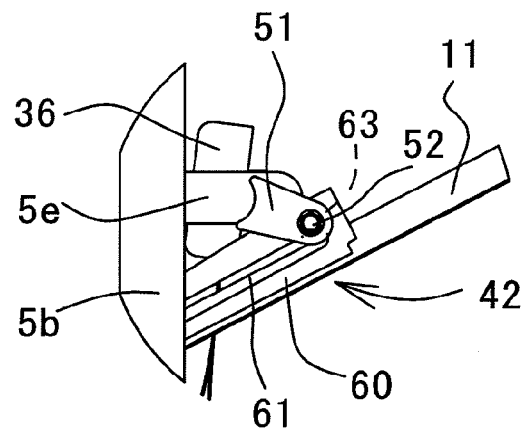
FIG. 14 is a left side view of the guide mechanism of the screen at the time of the expansion of the cargo bed.

FIGS. 12 to 14 show a detail of a guide mechanism 42 of the screen 11. In FIG. 12, guide plates 60 are respectively secured to left and right side surfaces of the screen 11, and the guide grooves 61 extending along the screen longitudinal direction are respectively formed in the guide plates 60. As described above, the guide grooves 61 are engaged with the guide pins 52 provided on both left and right ends of the cross member 5e via the brackets 51 movably in the screen longitudinal direction and pivotably. Further, as shown in FIG. 11, locking recess portions 63 bent at a substantially right angle with the substantially screen longitudinal direction from upper ends of the guide grooves 61 are formed in the guide plates 60.

The locking recess portions 63 are engaged with the guide pins 52 even in a case where the screen 11 is placed at any of the first position shown in FIG. 3 and the second position shown in FIG. 4. Specifically, size is set in such a manner that a distance L1 from the guide pin 52 of the cross member 5e to the hinge pin 53 of the lower end of the screen when the screen 11 is placed at the first position as in FIG. 3 matches with a distance L2 from the guide pin 52 to the hinge pin 53 of the screen when the screen 11 is placed at the second position as in FIG. 4.

When the screen 11 is placed at the first position as in FIG. 3, the seat bottom 22a of the rear seat 22 in the use state is fixed by the screen 11. Meanwhile, when the screen 11 is at the second position as in FIG. 4, the seat bottom 22a of the rear seat 22 in the stowed state is fixed by the screen 11.

Tasks relating to stowing of the rear seat 22, expansion of the cargo bed 9, and movement of the screen 11 will be described.

(1) Case where the Rear Seat 22 is in the Use State as in FIG. 3

As shown in FIG. 6, three riders can be seated on the rear seat 22 in the use state (the state that the rider can be seated) shown in FIG. 3. The rider seated in the central seating area S5 can put on the three point seatbelt apparatus 35 as well as the riders seated in the left and right seating areas S3, S4. Moreover, since the top anchor 35h is provided on the cross member 5e at the position lower than the upper end beam members 5d of the BOPS 5, the shoulder belt 35b of the central seating area S5 is not uselessly long.

As in FIG. 15, the backrest 22b of the rear seat 22 is locked in the standing state with respect to the vehicle body frame 1 by engagement between the hook 43 and the anchor 44, and the seat bottom 22a of the rear seat 22 is locked to the backrest 22b by the lock pin 45. Further, as in FIG. 12, the screen 11 is locked at the first position by fitting the guide pin 52 to the locking recess portion 63 of the guide groove 61. Thus, the screen 11 is not shaken or the seat bottom 22a of the rear seat 22 is not floated up, so that ride quality of the rear seat 22 can be favorably maintained.

(2) Case where the Rear Seat 22 is Changed from the Use State of FIG. 3 to the Stowed State of FIG. 4

Figure 10:
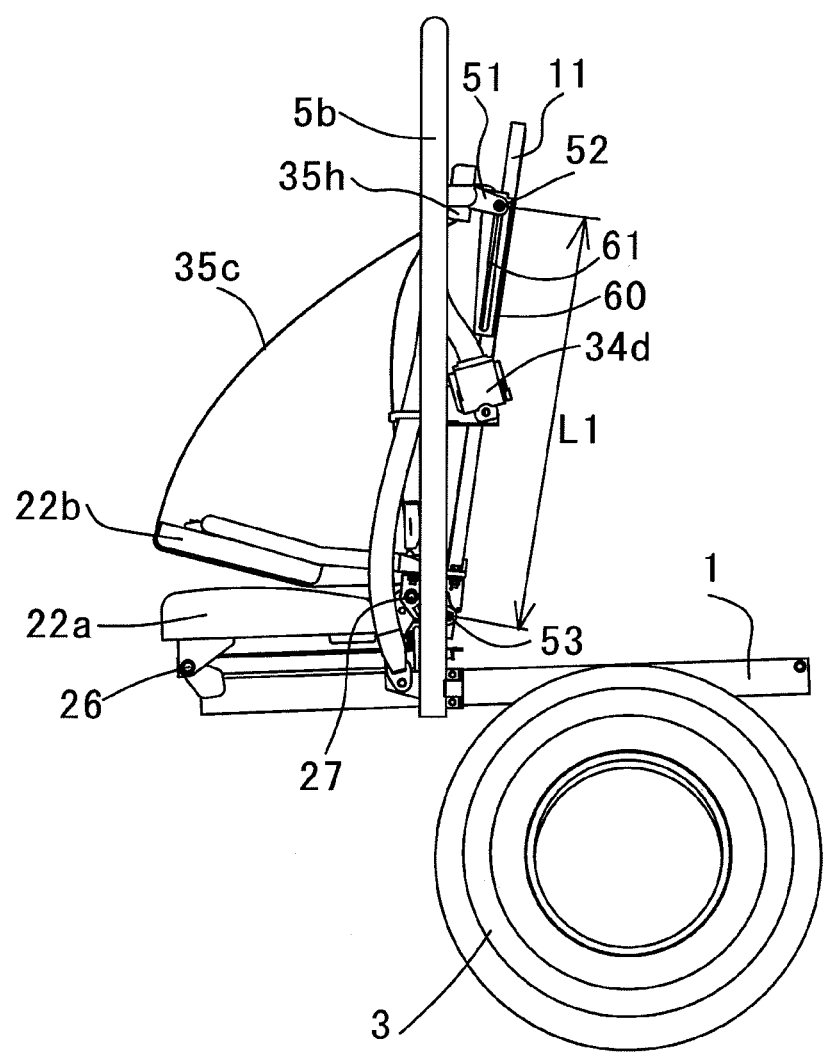
FIG. 10 is a left side view of the rear seat and the screen at the time of the non-expansion of the cargo bed.
Figure 16:
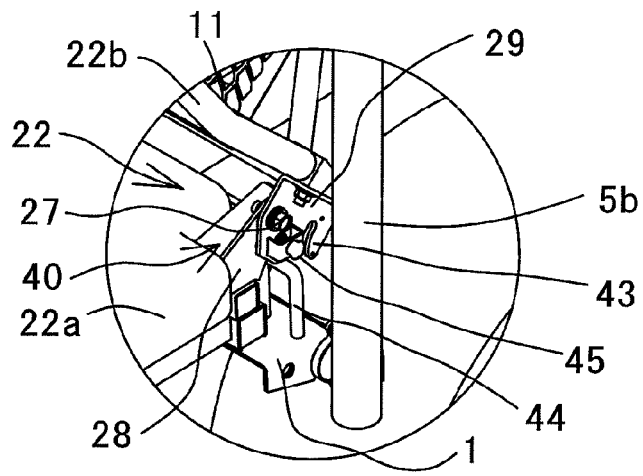
FIG. 16 is a perspective view of the lock mechanism of the rear seat in the middle of a stowing task.

In the lock mechanism 40 in a state of FIG. 15, firstly, by pulling the lock pin 45 leftward, lock between the backrest 22b and the seat bottom 22a is cancelled. After that, the backrest 22b is pivoted front-downward on the rear hinge 27 as shown in FIG. 10 and disposed on a surface of the seat bottom 22a. By folding the backrest 22b, as shown in FIGS. 16 and 17, the hook 43 of the backrest 22b is automatically removed from the anchor 44, and lock of the backrest 22b to the vehicle body frame 1 is cancelled.

Next, in FIG. 12, the guide pin 52 is removed from the locking recess portion 63 of the guide plate 60 of the screen 11, and the seat bottom 22a is pivoted front-upward on the front hinge 26 as shown in FIG. 11. In accordance with pivoting of the seat bottom 22a, the screen 11 is pivoted forward on the guide pin 52, and moved in the screen longitudinal direction (the longitudinal direction of the guide groove 61) with respect to the guide pin 52. Thereby, the lower end of the screen 11 is moved front-upward together with the rear end of the seat bottom 22a.

(3) Case where the Rear Seat is Changed to the Stowed State of FIG. 4

As in FIG. 4, when the rear seat 22 is stowed, the locking recess portion 63 of the guide groove 61 in a state of FIG. 13 is fitted to the guide pin 52 again as in FIG. 14. Thereby, the screen 11 is locked at the second position as in FIG. 8. By the screen 11 locked at the second position, the seat bottom 22a of the rear seat 22 is automatically locked in the standing state (stowed state).

It should be noted that in a case where the cargo bed 9 is expanded forward as in FIG. 9, the left and right sides of a forward-expanded part of the cargo bed 9 are covered by the left and right rear doors 7. That is, the left and right rear doors 7 play a role of side walls of the front part of the cargo bed.

Although the screen 11 inclines at the second position, the openings 65 are long holes elongated in the direction orthogonal to the vehicle width direction. Thus, the rider in the front seat 21 can visually recognize the rear side through the openings 65 as shown in FIG. 20.

[Summary of Effects of Embodiment]

Effects of the present embodiment will be briefly summarized as follows.

(1) The screen 11 is pivotably supported on the cross member 5e of the ROPS 5 by the guide pins 52. Thus, there is no need for bringing up the screen 11 in a task of expanding or contracting the cargo bed 9. Only by swinging the screen 11 about the guide pins 52, the position of the screen 11 can be changed between the first position and the second position in correspondence with a change between an expansion position and a non-expansion position of the cargo bed. That is, one worker can simply change the position of the screen 11.

(2) At the time of the expanded state of the cargo bed 9 as in FIG. 4, the screen 11 at the second position inclines so as to extend from the guide pins 52 toward the front lower side. Thus, a loading height of a cargo in the front part of the cargo bed 9 can be restricted. Thereby, shaking of the cargo due to a vibration during traveling can also be reduced.

(3) As shown in FIG. 11, the lower end of the screen 11 and the rear end of the seat bottom 22a are coupled to each other by the hinge pins 53 in such a manner that the screen 11 is moved from the first position to the second position in accordance with movement of the seat bottom 22a of the rear seat 22 to a front position. Thus, by performing a stowing task of the rear seat 22, the screen 11 can be automatically moved from the first position to the second position.

(4) As in FIG. 19, a large number of the openings 65 from which the rear side is visually recognizable through the screen 11 are formed in the screen 11, and the openings 65 are formed into a shape elongated in the up and down direction. Thus, even in a case where the screen 11 is moved to the second position of an inclination posture as in FIG. 20, the rear side can be confirmed through the openings 65 of the screen 11.

(5) As in FIGS. 12 to 14, the guide plates 60 having the guide grooves 61 extending along the screen longitudinal direction are provided in side walls of the screen 11, and the guide grooves 61 are engaged with the guide pins 52 in such a manner that the screen 11 is pivotable about the guide pins 52 and movable in the guide groove longitudinal direction. Thus, a moving task of the screen 11 between the first position and the second position can be smoothly performed by guiding of the guide grooves 61 and the guide pins 52.

(6) Further, the locking recess portions 63 to be fitted to the guide pins 52 so as to hinder the movement of the screen 11 in the longitudinal direction at any of the first position and the second position of the screen 11 are formed in ends of the guide grooves 61 in the longitudinal direction. Thus, the screen 11 can be locked by utilizing the same locking recess portions 63 at any of the first and second positions.

(7) As shown in FIGS. 15 to 17, the seat fixing anchor 44 is provided in a part of the vehicle body frame 1 of the cargo bed 9, and the hook 43 to be engaged with the anchor 44 so as to lock the backrest 22b in the standing state is provided in the backrest 22b. Thus, the seat bottom 22a of the rear seat 22 can be fixed to the vehicle body via the backrest 22b by the anchor 44 and the hook 43 to be engaged with the anchor. That is, by utilizing the seat fixing anchor, the backrest can be locked in the standing state together with the seat.

At the time of stowing the rear seat 22, the seat fixing anchor 44 can be engaged with a rope for fixing the loading cargo.

[Other Embodiments]

(1) Although the seat fixing anchor 44 is formed into an inverted U shape in the above embodiment, the anchor may be formed into an L shape.

(2) A shape of the openings 65 of the screen 11 is not limited to a diamond shape as in FIG. 19 but can be an oval shape, an elliptic shape, or a rectangular shape. However, every shape is a shape elongated in the direction orthogonal to the lateral direction.

(3) The present invention can also be applied to a vehicle provided with not a bench type seat but an independent type seat.

(4) The present invention is not limited to the structure of the above embodiment but includes various modified examples considered within a range not departing from the content described in the claims.

What is claimed is:

1. A utility vehicle comprising:
   a rollover protective structure having an upper end and surrounding a riding space;
   a front seat arranged in a front side of the riding space;
   a rear seat arranged in the riding space behind the front seat;
   a cargo bed provided behind the riding space, the cargo bed being changeable between an expanded state in which the cargo bed is expanded forward into the riding space and a non-expanded state in which the cargo bed is not expanded in the riding space;
   a screen arranged in a front end of the cargo bed; and
   pivot point portions disclosed lower than the upper end of the rollover protective structure,
   wherein the rear seat is changeable between a seating position and a stowed position, the seating position being for seating a rider on the rear seat, and the stowed position being a position in which the rear seat is moved toward the front seat in the expanded state of the cargo bed,
   wherein the screen is supported pivotably about the pivot point portions such that the screen is changeable between a first position in which the screen stands substantially upright at a location in a vicinity of the front end of the cargo bed in the non-expanded state of the cargo bed, and a second position in which the screen is inclined and extends from the pivot point portions toward the front side of the riding space.

2. The utility vehicle according to claim 1, wherein the rear seat includes a seat bottom,
   wherein a lower end of the screen and a rear end of the seat bottom of the rear seat are pivotably coupled to each other in such a manner that the screen is moved from the first position to the second position in accordance with movement of the rear seat to the stowed position.

3. The utility vehicle according to claim 1, wherein the screen includes a plurality of openings configured such that a rider in the riding space can see through the screen, each of the openings being elongated in an up and down direction.

4. The utility vehicle according to claim 1, wherein the screen includes side wall parts,
   wherein the side wall parts of the screen have guide grooves extending along a longitudinal direction of the screen,
   wherein the guide grooves are engaged with the pivot point portions in such a manner that the screen is pivotable about the pivot point portions and movable in a longitudinal direction of the guide grooves, and
   wherein the side wall parts have locking recess portions at ends of the guide grooves in the longitudinal direction of the guide grooves, and the locking recess portions engage with the pivot point portions to hinder movement of the screen in the longitudinal direction at the first position and the second position of the screen.

5. The utility vehicle according to claim 1, wherein the rear seat includes a backrest,
   wherein a seat fixing anchor is provided in the cargo bed, and
   wherein a hook to be engaged with the anchor so as to lock the backrest of the rear seat in a standing state is provided in the backrest.

6. The utility vehicle according to claim 5, wherein the anchor is formed into an inverted U shape or an L shape with which a rope for fixing a loading cargo is engageable.

7. The utility vehicle according to claim 5, wherein the screen includes side wall parts,
   wherein the side wall parts of the screen have guide grooves extending along a longitudinal direction of the screen,
   wherein the guide grooves are engaged with the pivot point portions in such a manner that the screen is pivotable about the pivot point portions and movable in a longitudinal direction of the guide grooves, and
   wherein the side wall parts have locking recess portions at ends of the guide grooves in the longitudinal direction of the guide grooves, and the locking recess portions engage with the pivot point portions to hinder movement of the screen in the longitudinal direction at the first position and the second position of the screen.

8. The utility vehicle according to claim 1, wherein the rear seat includes a seat bottom,
- wherein a lower end of the screen and a rear end of the seat bottom of the rear seat are pivotably coupled to each other in such a manner that the screen is moved from the first position to the second position in accordance with movement of the rear seat to the stowed position,
- wherein the screen includes side wall parts,
- wherein the side wall parts of the screen have guide grooves extending along a longitudinal direction of the screen,
- wherein the guide grooves are engaged with the pivot point portions in such a manner that the screen is pivotable about the pivot point portions and movable in a longitudinal direction of the guide grooves, and
- wherein the side wall parts have locking recess portions at ends of the guide grooves in the longitudinal direction of the guide grooves, and the locking recess portions engage with the pivot point portions to hinder movement of the screen in the longitudinal direction at the first position and the second position of the screen.

* * * * *